(12) United States Patent
Agarwal et al.

(10) Patent No.: US 6,859,442 B1
(45) Date of Patent: Feb. 22, 2005

(54) METHOD AND SYSTEM FOR TRANSPORT OF FRAME RELAY TRAFFIC OVER SATELLITE/WIRELESS NETWORKS

(75) Inventors: Anil K. Agarwal, Gaithersburg, MD (US); Sampath V. Kumar, N. Potomac, MD (US)

(73) Assignee: Comsat Corporation, Bethesda, MD (US)

( * ) Notice: Subject to any disclaimer, the term of this patent is extended or adjusted under 35 U.S.C. 154(b) by 0 days.

(21) Appl. No.: 09/529,852

(22) PCT Filed: Oct. 20, 1998

(86) PCT No.: PCT/US98/21635
§ 371 (c)(1),
(2), (4) Date: Jul. 26, 2000

(87) PCT Pub. No.: WO99/21329
PCT Pub. Date: Apr. 29, 1999

Related U.S. Application Data

(60) Provisional application No. 60/064,673, filed on Oct. 20, 1997, provisional application No. 60/062,496, filed on Oct. 20, 1997, and provisional application No. 60/062,497, filed on Oct. 20, 1997.

(51) Int. Cl.$^7$ ............................................... H04B 7/185
(52) U.S. Cl. ........................ 370/316; 370/394; 370/474; 370/477
(58) Field of Search ................................ 370/310, 315, 370/316, 320, 328, 338, 349, 389, 392, 394, 428, 429, 412–416, 470, 474, 477, 521, 124, 325, 312; 714/746, 747, 751, 752

(56) References Cited

U.S. PATENT DOCUMENTS

| | | | | |
|---|---|---|---|---|
| 5,438,565 A | * | 8/1995 | Hemmady et al. | 370/335 |
| 5,781,561 A | * | 7/1998 | Machida et al. | 714/752 |
| 6,034,950 A | * | 3/2000 | Sauer et al. | 370/310.2 |
| 6,172,972 B1 | * | 1/2001 | Birdwell et al. | 370/349 |
| 6,434,137 B1 | * | 8/2002 | Anderson et al. | 370/347 |

* cited by examiner

Primary Examiner—Ajit Patel
(74) Attorney, Agent, or Firm—Sughrue Mion, PLLC

(57) ABSTRACT

To efficiently transmit frame relay packets between terrestrial frame relay networks (10, 12) over a satellite/wireless network (14), the packets are processed by frame relay processors (16, 18) at both ends of the satellite/wireless network (14). Variable length frame relay packets are segmented into smaller packets called spackets. The system utilizes priority queueing and a scheduler (24) transmits the spackets over the satellite/wireless link. To enhance the quality of the satellite/wireless link, each frame contains a variable number of Reed-Solomon (RS) check bytes used for error correction. Further, several frames are interleaved before transmission over the satellite/wireless link to spread the effect of burst errors over several frames. Additionally, a header compression technique saves bandwidth by compressing a Virtual Circuit (VC) identifier of the frame relay packet into a smaller value and maps the VCs to a value as specified by the size of the compressed VC field.

46 Claims, 3 Drawing Sheets

METHOD AND SYSTEM FOR TRANSPORT OF FRAME RELAY TRAFFIC OVER SATELLITE/WIRELESS NETWORKS

CROSS REFERENCE TO RELATED APPLICATION

This application claims priority from U.S. Provisional Application Ser. Nos. 60/062,496, 60/062,497 and 60/064,673, filed Oct. 20, 1997. The disclosures of these provisional patent applications are incorporated hereby by reference in their entirety.

BACKGROUND OF THE INVENTION

1. Field of the Invention

The present invention relates to a method and system for transporting frame relay packets of data over satellite or wireless communication links, and, in particular, to a method and system employing a robust, flexible frame format to efficiently transmit data under varying link and data traffic conditions.

2. Description of the Related Art

Transport of frame relay packets over satellite/wireless links introduces a number of technical issues that are not present in terrestrial wireline links. First, satellite/wireless links tend to be much more noisy than terrestrial wireline links. Consequently, satellite/wireless links require the use of error correcting techniques. Second, the bandwidth on a satellite/wireless link is a scarce resource. In the event of data traffic congestion, consideration must be given to the priority of the data being transmitted, with high priority traffic being given preference over low priority traffic. Data compression can also be employed to better utilize available bandwidth. Third, unlike asynchronous transfer mode (ATM) cells, frame relay packets are variable length. Thus, the frame formats used to communicate between satellite/wireless terminals need to be able to transport variable length packets efficiently. Fourth, carrying prioritized data over low bandwidth links creates certain problems. Assume that the transmission of a large, low priority packet has just begun. If the link bandwidth is low, then it may take a long time for the packet to transmit. A high priority packet may then have to wait for an intolerably long period of time before being transmitted.

There are no known systems specifically tailored to address the unique issues relating to transport of frame relay packets over satellite/wireless links. Traditionally, frame relay traffic has been transported over satellite/wireless links by directly connecting frame relay switches to satellite/wireless modems without significant processing to ensure efficient and timely transmission of data over the links. Thus, the present use of satellite/wireless links to transport frame relay data can significantly limit the performance of the frame relay networks.

SUMMARY OF THE INVENTION

It is an object of the present invention to efficiently transmit variable length packets of data, such as frame relay packets, over satellite/wireless links, while addressing the data transmission issues presented by transport of such packets over satellite/wireless links.

It is another object of the present invention to avoid the excessive delay of high priority data over satellite/wireless links having limited bandwidth resources by efficiently segmenting and scheduling frame relay packets of different priorities.

It is yet another object of the present invention to minimize data errors caused by the relatively noisy communication medium of satellite/wireless links without introducing excessive transmission overhead by using a dynamic, robust error correction technique that is responsive to varying link conditions.

It is a further object of the present invention to maximize the use of available bandwidth by judiciously employing data compression to transmit data over satellite/wireless links.

The aforesaid objects are achieved individually and in combination, and it is not intended that the present invention be construed as requiring two or more of the objects to be combined unless expressly required by the claims attached hereto.

To achieve these objects, the system of the present invention efficiently transports frame relay traffic over satellite/wireless networks utilizing several techniques. According to the present invention, variable length frame relay packets are segmented into smaller packets called "spackets" to provide for efficient scheduling of packets of different priorities. A frame may carry several variable-sized spackets, or a single spacket may be carried over several frames. In this manner, high priority packets can avoid delays due to large, low-priority packets, because spackets belonging to a high priority packet can be transferred after a single spacket belonging to a low-priority packet is transferred.

Further, Virtual Channels (VCs) can be configured to enable data compression such that spackets belonging to a VC are passed through a data compressor/decompressor combination to save bandwidth. The system also utilizes priority queuing, wherein VCs can be configured to be either high or low priority, and a scheduler uses this information to fairly transmit the various spackets over the satellite/wireless link. The use of spackets to reduce the delays experienced by high priority packets allows for efficient implementation of compression and decompression modules.

The frame format of the present invention also allows fast synchronization and the exchange of coding information. To enhance the quality of the satellite or wireless link, each frame contains Reed-Solomon (RS) check bytes used for error correction, that can be adaptively changed based on varying link conditions. The number of RS check bytes in a frame can be changed on the fly, without any loss of data, to compensate for varying link conditions. The link quality is monitored, and the observed link quality is used as the criterion for setting the number of RS check bytes in a frame. Further, several frames are interleaved before transmission over the satellite/wireless link to spread the effect of burst errors over several frames, all of which can then be corrected by the forward error correction (FEC) in the frames.

Additionally, a header compression technique is utilized to save bandwidth by compressing the VC identifier of a frame relay packet into a smaller value and mapping the VCs to a value as specified by the size of the compressed VC Id field. This technique utilizes the fact that the number of VCs carried over the satellite/wireless link is not very large and can be compressed to a much smaller VC identifier field.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

DETAILED DESCRIPTION OF THE PREFERRED EMBODIMENTS

Figure 1:
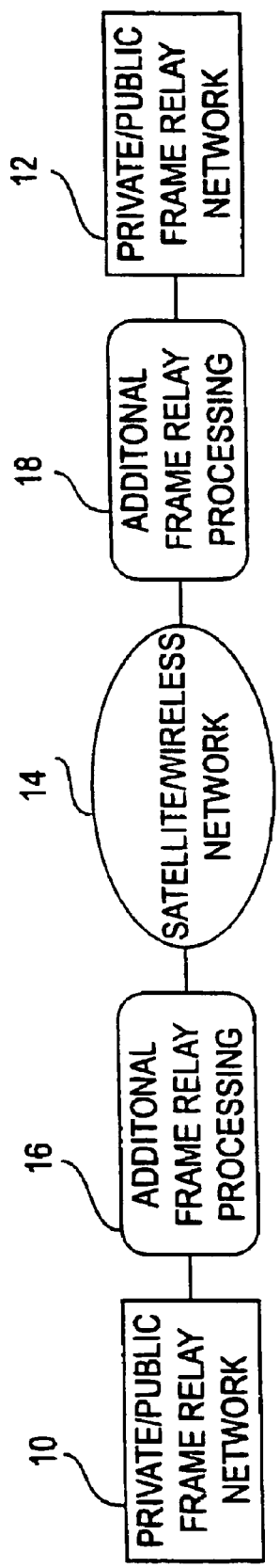
FIG. 1 is a functional block diagram illustrating the functional relationship of the present invention to a frame relay network transmitting data over a satellite/wireless network.

FIG. 1 is a top-level block diagram illustrating how the processing performed in accordance with the present invention relates to the overall transport mechanism, wherein two-way transmission of frame relay data between private/public frame relay networks 10 and 12 is carried over a satellite/wireless network 14. According to the present invention, additional frame relay processing is performed between frame relay network 10 and satellite/wireless network 14 and between frame relay network 12 and satellite/wireless network 14, as indicated, respectively, by functional blocks 16 and 18 which represent additional frame relay processing modules.

The additional frame relay processing techniques performed in accordance with the present invention to efficiently carry frame relay packets over satellite/wireless links include: frame relay processing at the physical layer and the data link layer; formatting of data (variable length packets, segmentation and reassembly, resequencing); dynamic forward error coding (FEC); interleaving of frames (to spread the effect of burst errors); per-VC data compression; prioritization and scheduling; and header compression.

Figure 2:
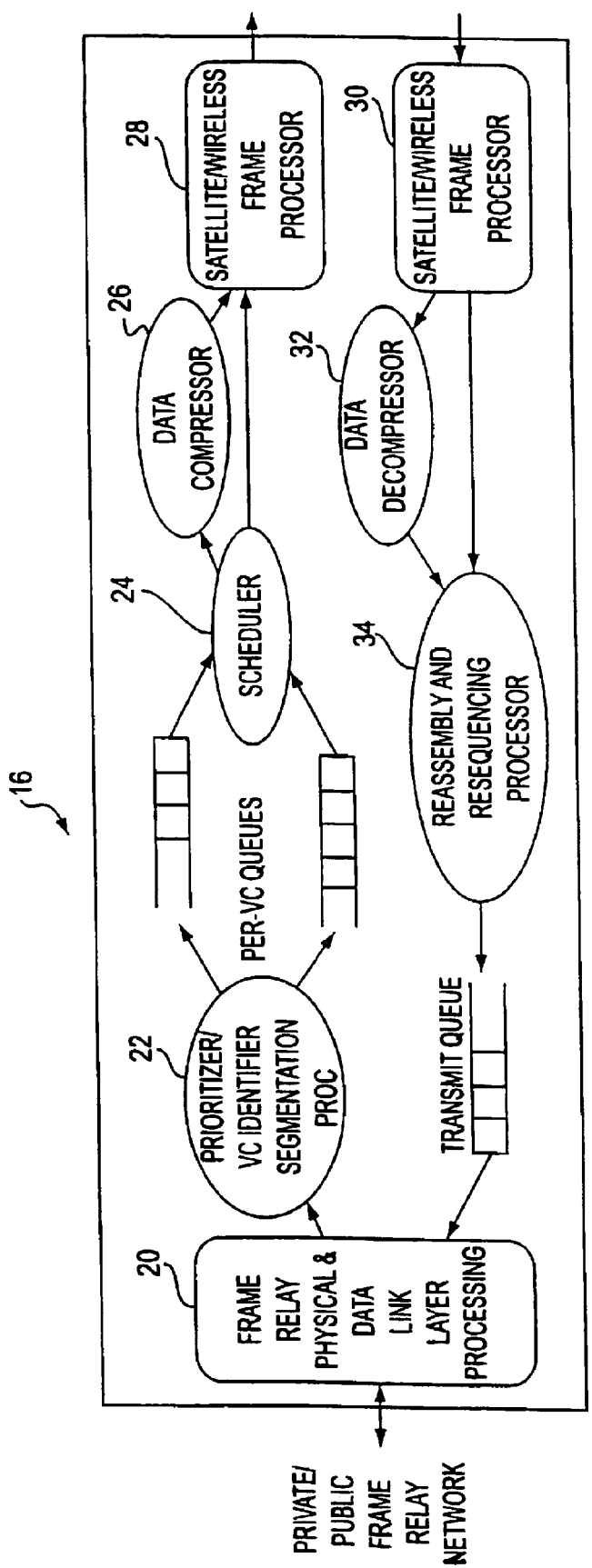
FIG. 2 is a high-level functional diagram illustrating the various functions performed by the additional frame relay processing module of the present invention.

FIG. 2 is a high-level functional diagram illustrating the various functions performed by the additional frame relay processing module 16 between frame relay network 10 and satellite/wireless network 14. Similar processing is performed by additional frame relay processing module 18. The system of the present invention uses several innovative techniques to efficiently transport frame relay packets over satellite/wireless links. The system uses a robust, flexible frame format between the two communicating terminals in which frame relay data packets are segmented into smaller packets called "spackets." Several variable-sized spackets can be transported in a frame, and a single spacket can be transported over several frames.

The frame format allows fast synchronization and the exchange of coding information. Each frame contains Reed-Solomon (RS) check bytes that are used for error correction and to enhance the quality of the satellite/wireless link. The number of RS check bytes in a frame can be changed on the fly, without any loss of data, to compensate for varying link conditions. The decision to change the RS check bytes in a frame is based on the results of constant monitoring of the link quality. Additionally, several frames are interleaved before transmission over the satellite/wireless link to help spread the effect of burst errors over several frames, all of which can then be corrected by the FEC in the frames.

Further, virtual channels (VCs) can be configured to enable data compression, so that spackets belonging to a VC are passed through a data compressor/decompressor combination to save bandwidth. VCs can also be configured to be either high or low priority VCs, and a scheduler uses this information to fairly transmit the various spackets over the satellite/wireless link.

To minimize the large delays introduced by the transmission of low priority packets on a low bit rate link, and the delay experienced by high priority packets which are waiting to be scheduled, large packets are segmented into several, smaller spackets. Because high priority spackets can be transmitted after transmission of only a single low priority spacket, the delays experienced by high priority packets are substantially reduced. This also allows for efficient implementation of the compression and decompression modules.

Furthermore, to save bandwidth, header compression techniques are employed to compress the VC Identifier (VC Id) of a frame relay packet into a smaller value. This technique takes advantage of the fact that the number of VCs carried over the satellite/wireless link is not very large and can be uniquely represented by a small number, so that the VC Identifier can be compressed to a much smaller VC Id field. The system allows flexible configuration of various parameters in the system. The following are some of the configurable system parameters: Frame Size, Interleaver Depth, Enable/Disable Dynamic RS FEC, Set Max/Min Checkbytes for the Dynamic RS FEC, Enable/Disable data compression, Priorities and Compression for various VCs, Enable/Disable Header Compression, and Number of spackets between resetting the compression and decompression histories in the data compressor and the decompressor. Each of the above techniques is described in greater detail in the following sections.

1. Frame Relay Processing

As shown in FIG. 2, additional frame relay processing module 16 includes a frame relay physical and data link layer processor 20 that receives the frame relay packets from frame relay network 10. Frame relay physical and data link layer processor 20 processes the frame relay packets as specified in International Telecommunication Union (ITU) recommendation Q.922 (Link Access Procedures for Frame Relay). The physical layer processing is similar to the processing of any HDLC data stream. This is the processing performed in most Frame Relay Access Devices (FRADs).

A frame relay packet received from the terrestrial network 10 consists of payload data, a cyclic redundancy check (CRC) field, and flags at the beginning and the end of the frame. The frame relay processor 20 removes the flags and the CRC fields and transports only the payload section of the frame relay packet over the satellite/wireless link 14. The CRC and the flag information is regenerated at the receiving terminal and added to the packet in module 18 before it is transmitted to the receive side terrestrial network 12.

2. Prioritizer/VC Identifier

The queuing of data to be transported over the satellite/wireless link 14 can be based on priorities or virtual channels (VCs). In the former case (i.e., queuing performed at the priority level), there are separate queues for high and low priority data. VCs are configured to be either low or high priority VCs. A prioritizer/VC identifier segmentation processor 22 adds cells received from the terrestrial network 10 to be priority queues based on whether the VCs they belong to have been configured as high or low priority. A scheduler 24 transmits cells from these priority queues. Cells in each priority queue are transmitted on a first-in-first-out (FIFO) basis. With this queuing system, the issue of fairness between VCs of the same priority cannot be addressed.

In the case of queuing performed at the VC level, per-VC queues are maintained, which implies a separate queue for each VC. The scheduler transmits cells from all of these queues. In this case, the issue of fairness among different VCs can be addressed. As shown in FIG. 2, prioritizer/VC identifier segmentation processor 22 generates separate, per-VC data queues and delivers these queues to scheduler 24.

If header compression has been enabled in the system, then the VCs are mapped into a new value as specified by the size of the compressed VC field. This header compression information is periodically exchanged between the communicating terminals 16 and 18. Further, every time a new mapping is created, this information is asynchronously exchanged between the terminals before the actual transfer of the mapped packet begins.

3. Segmentation Processor

Figure 3:
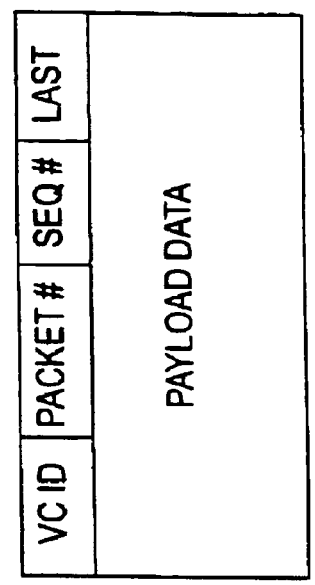
FIG. 3 illustrates the fields contained in a spacket according to an exemplary embodiment of the present invention.

Referring again to FIG. 2, prioritizer/VC identifier segmentation processor 22 segments the variable-length frame relay packets into several smaller packets called spackets. These spackets allow efficient scheduling of packets belonging to multiple priorities and lossless data compression. FIG. 3 shows the various fields contained in a spacket in accordance with an exemplary embodiment of the present invention.

As mentioned above, a large, low priority packet, if transmitted over the satellite/wireless network 14 as a single segment, will cause high priority packets to wait until the entire transmission is completed. This transmission scheme introduces a significant amount of delay variation into the high priority traffic. Such delay variation can be intolerable for traffic such as video and audio traffic which require stringent delay variation from the network. Since spackets transfer large frame relay packets as smaller segments, spackets belonging to a high priority packet can be transferred after only a single spacket from a low priority packet has been transferred, thus minimizing the delay variance that the high priority packet experiences. This technique minimizes the delay variance significantly, and results in the satellite/wireless network performance being better than that of terrestrial networks with respect to delay variance.

Each frame relay packet is segmented to one or more spackets. If a frame relay packet is segmented into more than one spacket, then all but the last spacket are n bytes long. The last spacket can also be n bytes long if the frame relay packet had a length which was an integral multiple of n to begin with. A spacket is then prepended with a header as shown in FIG. 3. The spacket header contains the VC Identifier to which the packet belongs. The header also contains the packet and the sequence numbers. The packet number increments for each new frame relay packet. The sequence number increments for each spacket within the frame relay packet. Information about the priority of the packets and whether or not the packets are compressed is maintained locally. All this information is used to perform segmentation/reassembly, data compression/decompression, prioritization and scheduling. The spacket header also contains a "last field" which indicates whether or not the spacket is the last spacket for the frame relay packet. If spacket is the last spacket for the frame relay packet, then, at the receiving terminal 18, the frame relay packet can be reassembled and transmitted over the terrestrial link 12.

The sizes of the various fields within the spacket can be set in accordance with the specific requirements and design parameters of particular networks. The VC Id field can either be the size of the entire VC field in the frame relay packet or can be the size specified in the header compression parameters. The size of the Packet number and Sequence number fields are also set in accordance with the system design. The "last field" is preferably a single bit.

The size of the payload is determined by a trade-off between the overheads and the performance of the system. If the payload size is very low, the overheads will be very high (resulting in reduced payload throughput per transmitted bit), but the delay variance performance of the system will be very good. If the payload size is set to a large value, then the delay variance performance will be poorer but the overheads will be lower (resulting in higher payload throughput per transmitted bit). Hence, the sizes of the overhead and payload fields of the spacket are set in accordance with system performance specifications such as permissible delay variances and throughput efficiency requirements.

4. Per-VC Queues

As shown in FIG. 2, queues of spackets belonging to different VCs are stored for use by scheduler 24. As described in section 2, the queues can be based on priorities or VCs. In the former case, queues for the priorities are maintained, and the cells in each priority queue are transmitted on a FIFO basis. The more preferable mode of queuing is to have a queue for each VC, and to store the cells belonging to each VC in its corresponding queue. Cells in these per-VC queues are also transmitted on a FIFO basis to preserve sequence integrity. Scheduler 24 is designed to be fair to VCs within a priority as well as between priorities.

5. Scheduler

The scheduler sends spackets belonging to various VCs over the satellite or wireless link 14. If the spacket is to be compressed, the spacket is first sent to a Data Compressor 26 (FIG. 2). Scheduler 24 uses all the priority information for the various VCs and attempts to be fair in the scheduling of the spackets. A simple scheduling algorithm which can be employed by scheduler 24 is to process all the high priority per-VC queues on a round-robin basis and then to process all the low priority per-VC queues on a round-robin basis. Another scheduling option is for scheduler 24 to transmit at least one low priority cell every n high priority cells. This assures some degree of fairness between priorities. A further option is to use, within a priority, a weighted round-robin scheduling algorithm to transmit cells from per-VC queues, with the weights reflecting the bandwidths for which the VCs have subscribed. This scheduling algorithm attempts to schedule different VCs fairly.

6. Data Compressor

As shown in FIG. 2, spackets that belong to a VC which has been specified to be compressed are compressed by the data compressor 26. To achieve loss-less data compression, the compression and decompression histories are reset every n spackets, where n is a configurable, integer parameter. With the FEC, the link is maintained at a very low byte error ratio (BER). If a spacket does get corrupted, then the resetting of the histories will ensure that not more than n spackets are affected.

7. Satellite/Wireless Frame Processor

Figure 4:
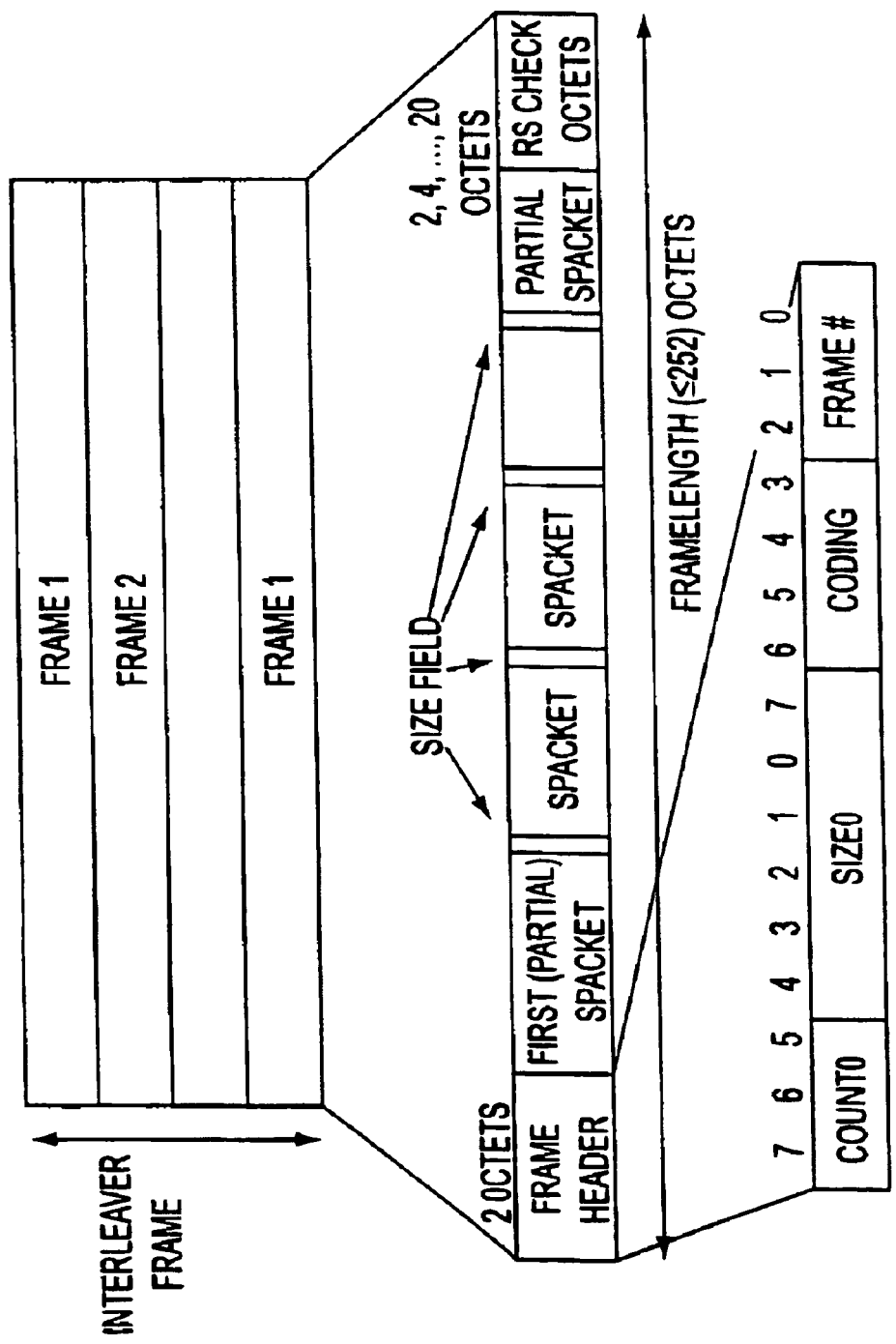
FIG. 4 illustrates the frame format of a satellite/wireless frame structure according to an exemplary embodiment of the present invention.

According to another aspect of the present invention, a unique frame structure is used to transport data from frame relay packets over the satellite/wireless link. This frame structure is designed to facilitate fast frame synchronization, accommodation of several variable-size packets, fast recovery from lost frames, very low bandwidth overhead, and dynamic Reed-Solomon coding changes without introducing data loss during the coding rate change transition. FIG. 4 illustrates the frame format of the satellite/wireless frame structure according to an exemplary embodiment of the present invention.

The fundamental unit of transmission over the satellite/wireless link is a fixed size frame that is n octets long. If an interleaving depth of I is used, then I such frames are used to compose an "interleaver frame." A satellite/wireless frame processor 28 (FIG. 2) rearranges the order of the bytes in the interleaver frame and transmits each byte sequentially over the satellite/wireless link 14. Note that there are no special synchronization bits in the frame structure shown in FIG. 4.

Each frame is n bytes long and includes a 2-octet header followed by the frame payload, and is terminated by 2t octets (t>0) of Reed-Solomon coding check bytes at the end of the frame. The payload contains a combination of several variable-size packets (the packets may contain compressed or uncompressed spackets).

The rules for filling a frame payload with spackets are as follows:

1. If the previously transmitted frame contained a partial spacket at the end of the payload, the frame payload currently being transmitted begins with the next portion of that spacket. This portion shall consume min (4*size0, payload_size) octets of the payload, where size0≧0. The actual size of this partial spacket may be up to three octets less than 4*size0, in which case the extra octets shall be filled with zeroes.
2. After the initial partial spacket segment, the payload contains count0 spackets where count0≧0. If the last Spacket cannot be entirely contained in the payload, then only its initial portion is included in the payload. Each spacket is preceded by a 1-octet-length (in octets) field followed by the spacket contents. The length field contains the size of the spacket in bytes.
3. If there are any octets left over in the payload, then the first such unused octet shall contain a zero. The rest of the octets, if any, shall be filled sequentially with the numbers i, i+1, i+2 where i is the octet number of the first such octet in the payload (octets in the payload are implicitly numbered 0, 1, . . . ).

From these rules, it can see that a frame payload may contain several spackets and that the spackets can be transmitted over more than one frame. A frame with no spackets contains the sequence 0, 1, 2, . . . in the payload. A spacket may be split across more than two frames if required. This frame structure design allows the possibility of dynamically changing the Reed-Solomon error correction code size by correspondingly changing the payload size, while keeping the frame size constant. If the receiver "loses" a frame, for example, due to excessive bit errors in the frame, the size0 field allows rapid determination of the spacket boundary on the very next frame.

The frame header of the satellite/wireless frame structure shown in FIG. 4 has four fields which are described in Table 1.

The Read-Solomon checkbytes inserted at the end of each frame are the checkbytes generated by a standard Reed-Solomon algorithm with frame size=N bytes and number of checkbytes=2t. During the time that the system has not achieved receive synchronization, the system sets the Reed-Solomon code value of its receiver and its transmitter to the maximum value. After the system achieves receive synchronization and detects that the remote terminal has also achieved receive synchronization (i.e., the coding field in the received frame header of frame number 0 contains a valid code value), the adaptive coding algorithm is activated, as described below.

TABLE 1

Description of the Fields in the Header of the Satellite/Wireless Frame

| Field | Description |
|---|---|
| Count0 | Number of Spackets in frame. Does not include the first Spacket, if any. Includes the last Spacket, if any. |
| Size0 | Size of first partial Spacket in frame divided by 4. |
| Frame Num | The frame number. Each frame is sequentially numbered 0, 1, . . ., 7, 0, . . . |
| Coding | If FrameNum > 3, the coding field represents the number of Reed-Solomon octets/2 that will be used starting with the next frame numbered 0. Note that 0 is an invalid value for the coding field. If FrameNum == 0, the coding field represents the suggested value of the number of Reed-Solomon octets/2 that the other side should use for its own transmission. If the coding field value is 0 × F, the value implies that the transmitting terminal is not yet synchronized to its receiving bit stream. Note that 0 is an invalid value for the coding field. If FrameNum == 1, the least significant bit of the coding field is 1 if spacket header compression is activated at the transmitting terminal, 0 otherwise. Other bits of the field are reserved for future use. If FrameNum is 2 or 3, the coding field shall be set to 0's. |

7.1 Bit Error Ratio Measurement Algorithm

The bit error ratio measurement algorithm in accordance with an exemplary embodiment of the present invention is as follows.

1. Whenever the system receiver achieves synchronization, it initializes the following variables as shown below.
    BER=$10^{-3}$
    MINBER=1/715827880
    Variable BER is the "byte error ratio", not the bit error ratio. The bit error ratio is approximately equal to BER divided by 8, assume a single bit error per byte.
2. While the system receiver is in synchronization, the algorithm performs the following computation once per second:

```
nbytes = total number of bytes received since the last time this
computation was done
nerrors = total number of (byte) corrections made by the Reed-Solomon
decoder i since the last time this computation was done
if nerrors < 8 and nbytes <1 / BER *4 and nbytes <1 / MINBER*2
    return --accumulate more data and try again later
if nerrors <= 0
    nerrors = 1
currBER = nerrors / nbytes
if currBER > BER --worse?
    BER=1 / ((1 / BER+ 1 /currBER*3) / 4) -- fast filter
else
    if 1 / currBER> 1 / BER * 5 / 4
        BER = 1 / (1/ BER +1 / currBER / 32) -- very slow filter
    else
        BER = 1/ ((1 / BER * 7 + 1 / currBER) / 8) - slow filter
    endif
endif
if BER < MINBER
    BER = MINBER
```

The algorithm measures BER very accurately. The measurement is performed very quickly when BER is high. When BER is low, the algorithm takes longer between computations, since it takes longer periods of time before sufficient bit errors accumulate to make an accurate computation.

The "filter" parameters in the above algorithm have been chosen in a way that the algorithm reacts quickly to deteriorating BER and reacts slowly to improving BER. These parameters can be changed to get different reaction times.

Other alternate filter algorithms can be used depending on the link error characteristics.

The above algorithm can be efficiently implemented in software using integer numbers only by maintaining the inverse value of BER and currBER as integer numbers between 1 and $2^{32}$.

7.2 Reed-Solomon Code Value Selection Algorithm

The follow algorithm is used if adaptive Viterbi code control is not used, i.e., only Reed-Solomon coding is adaptively changed. Once a BER computation has been done, the Reed-Solomon code value appropriate for that BER is computed by the following algorithm.

Initialization:
    codeindex=0

Reed-Solomon Code Value Computation:

The table codetable shown below and the computed BER value are used to compute the code value. Each entry in the codetab table has two fields: the inverse of a BER value (BER) and the corresponding Reed-Solomon code value (number of checkbytes).

The codeindex variable is modified as follows:

```
while codeindex > 0 and 1/ BER >= codetab[codeindex - 1].BER_
       --codeindex
while codeindex <codetable size and 1/ BER <= codetab[codeindex + 1].
BER_
       ++codeindex
```

The code selection is done as follows:

```
    code = codetab[codeindex].code
codetab =
    {715827880,2},
    {562241498,4},
    {20133667,4},
    {6636252, 6},
    {1078755, 6},
    {635218, 8},
    {219936, 8},
    {154438, 10},
    {69463, 10},
    {53221, 12},
    {29402, 12},
    {24125, 14},
    {14790, 14},
    {12779, 16},
    {8859, 16},
    {7841, 18},
    {5782, 18},
    {5224, 20}
```

The above table values have been derived assuming that bit errors are bursty with an average burst length of 64 and a burst error density within a burst of 20%. For random bit error situations, the error introduced by the use of this table is small; however, a similar table can be derived and used for such cases.

The table values and the code selection algorithm have been designed so that there is an appropriate amount of hysteresis, so that if the BER fluctuates near a threshold value, the algorithm does not rapidly select alternate values around the threshold value. The table values have also been derived so that the net link quality after Reed-Solomon correction is $10^{-10}$. The figure $10^{-10}$ represents the ratio of the spackets that are lost due to uncorrectable bit errors to the total number of spackets.

The table values have been derived so that there is a 0.5 decibel amount of "margin" built into the link quality measurement, i.e., even if the link signal to noise ratio drops by 0.5 decibels, the link quality will be maintained at $10^{-10}$. Hence, the actual quality experienced by applications is better than $10^{-10}$ most of the time.

7.3 Reed-Solomon Code Value Exchange Algorithm

The computed value of the Reed-Solomon code value is sent over the satellite/wireless link 14 in the coding field of each transmitted frame whose frame number is 0. The actual value sent in the coding field is the code value divided by 2.

7.4 Reed-Solomon Code Synchronized Change Algorithm

The system monitors the value of the coding field of every received frame whose frame number is 0. If the received value is a valid code value between 1 and 10 and is different from the value currently being used for the system's transmitted frames, then, in the next transmitted frame having a frame number of 4, the coding field in the frame header is set to the new code value. This new value is repeated in all frames thereafter. Frames are transmitted using the old value of the Reed-Solomon code until the next frame numbered 7. The next frame numbered 0 and all frames thereafter are transmitted using the new value of the code. As an option, the transmitting terminal may modify the received code value to lie within certain configurable minimum and maximum values before implementing code changes. The boundary within the frame between the payload and the Reed-Solomon field (see FIG. 4) is appropriately set.

A terminal monitors the value of the coding field of every received frame whose frame number is greater than or equal to 4. If the received value is non-zero and is different from the value being used for the terminal's receive frames, then, after the next (or current) received frame having a frame number of 7, (i.e., just before the receipt of the next frame numbered 0), the Reed-Solomon decoder is programmed for the new value of the Reed-Solomon code. The boundary within the frame between the payload and the Reed-Solomon field (see FIG. 4) is appropriately set.

7.5 Extensions for Viterbi Coding Control

The system can be used for Viterbi coding control as well as Reed-Solomon coding control. Such a system can use a combination of Viterbi and Reed-Solomon codes. The basic algorithm for setting the number of Reed-Solomon check bytes remains the same (see Section 7.2), although a different code table codetab is used. This table has values for both the Viterbi code and the Reed-Solomon code in each entry, along with the BER inverse value. The exact values for each entry in the table (not shown) are derived using similar principles as is done for the above table that does not use Viterbi code control. The first approximately 20 entries use Viterbi code rate 1; the next approximately 20 entries use Viterbi code rate 7/8; the next approximately 20 entries use Viterbi code rate 3/4, and so on. Not all Reed-Solomon code values get used for each Viterbi code rate.

Whenever a new code rate is selected, both the Viterbi code value and the Reed-Solomon code values are sent to the remote device. Viterbi code changes, in general, may cause the receive modem to lose data synchronization, leading to loss of frame synchronization in the terminal. In such a case, the receiving terminal shall not change its receive Viterbi and Reed-Solomon code rates for up to N (e.g., N=4) seconds after a Viterbi change. The transmitting terminal shall similarly retain its Viterbi and Reed-Solomon code rates for N seconds even if the transmitting terminal detects that the remote device has lost synchronization.

8. Data Decompressor

Frame relay processing module 16 includes a satellite/ wireless frame receive processor 30 which receives data transmitted over the satellite/wireless network 14 from processor 18 (FIG. 2). A data decompressor 32 decompresses the spackets belonging to a VC which has been configured to be compressed. Compression and decompression histories are maintained in data compressor 26 and decompressor 32, respectively. These histories are reset once every n spackets, where n is a configurable, integer parameter. This is done to minimize the effect that a lost or erroneous spacket has on subsequent spackets.

9. Reassembly and Resequencing Processor

Once received by satellite/wireless frame processor 30 and decompressed (if applicable) by data compressor 32, a reassembly and resequencing processor 34 reassembles and resequences the data. Reassembly and resequencing processor 34 keeps track of spackets belonging to all the VCs. The reassembly algorithm works on a per-VC basis. The spackets for each VC are resequenced based on the sequence and packet numbers contained in the spacket header (FIG. 3). The following rules are used to reassemble frame relay packets:

1. If a spacket with a sequence number of zero is received, discard any previous incompletely assembled frame relay packet and start reassembling this new packet.
2. If a spacket with the same packet number and VC Id, with a sequence number one more than the previous spacket is received, then append this spacket to the partially reassembled frame relay packet. If the "last field" indicates that the spacket is the last spacket of a frame relay packet, the frame relay packet has been completely assembled.
3. If a spacket having a non-zero sequence number which is out of sequence is received, discard this new spacket and any partially reassembled frame relay packet.
4. If the packet number of the spacket received is not the same as that of the previous spacket and the sequence number of the received spacket is not zero, discard this new spacket and any partially reassembled frame relay packet.

Optionally, a length field can be added to the frame relay packet at the transmitting terminal 16 before the packet is segmented and transmitted over the satellite/wireless link. This length field can be used at the receiving terminal 18 to check if the frame relay packet has been reassembled properly. If the frame relay packet has been properly reassembled, the frame relay packet is added to the transmit queue.

10. Transmit Queue

As shown in FIG. 2, the transmit queue contains frame relay packets received from the remote terminal 18 which will be transmitted over the terrestrial link 10. These packets are processed by the frame relay physical and data link layer processing module 20 and transmitted over the terrestrial link 10.

Having described preferred embodiments of a new method and system for transport of frame relay traffic over satellite/wireless networks, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A method of transporting frame relay data over a satellite or wireless network, comprising the steps of:
   receiving frame relay packets from a frame relay network;
   prioritizing the frame relay packets;
   segmenting the payload data of each of the frame relay packets to form spackets;
   scheduling transmission of the spackets in accordance with priorities of the frame relay packets to which the spackets correspond;
   forming fixed-sized satellite/wireless frames, each containing plural spackets and a variable number of error correction code bytes; and
   transmitting the satellite/wireless frames over the satellite or wireless network.

2. The method according to claim 1, further comprising the step of compressing the spackets prior to forming the satellite/wireless frames.

3. The method according to claim 1, wherein said prioritizing step includes queuing the spackets in a plurality of data queues as a function of priorities of the frame relay packets to which the spackets correspond.

4. The method according to claim 3, wherein the plurality of queues correspond to different priority levels.

5. The method according to claim 3, wherein the plurality of queues correspond to a plurality of virtual channels.

6. The method according to claim 1, wherein said segmenting step includes segmenting the payload data of each of the frame relay packets into plural spackets, wherein all of the plural spackets, except a last of the plural spackets, is required to be n bytes in length, where n is an integer.

7. The method according to claim 1, wherein said segmenting step includes prepending each spacket with a header.

8. The method according to claim 7, wherein the header of each spacket includes: a packet number indicating to which frame relay packet the spacket corresponds; a sequence number indicating the position of the spacket within the frame relay packet; a VC Id field indicating the virtual channel to which the frame relay packet corresponds; and a last field indicating whether or not the spacket is the last spacket in the frame relay packet.

9. The method according to claim 8, wherein a VC identifier contained in the VD Id field is compressed from a VC identifier contained in the frame relay packet.

10. The method according to claim 1, wherein the spackets contained within a satellite/wireless frame are variable in size.

11. The method according to claim 1, wherein a single spacket is transmittable over plural satellite/wireless frames.

12. The method according to claim 1, wherein said forming step includes forming an interleaver frame from plural satellite/wireless frames, wherein the order of the bytes in the interleaver frame is rearranged to spread the effects of burst errors over several satellite/wireless frames.

13. The method according to claim 1, further comprising the step of monitoring the condition of a link over the satellite or wireless network,
   wherein said forming step further comprises varying the variable number of error correction code bytes in response to variations in link conditions observed in said monitoring step.

14. The method according to claim 13, wherein said monitoring step includes calculating a byte error ratio and said forming step includes setting the number of error correction code bytes as a function of the byte error ratio.

15. The method according to claim 14, wherein the byte error ratio is calculated more quickly when the bit error rate is high and more slowly when the bit error rate is low.

16. The method according to claim 14, wherein the error correction code bytes are Reed-Solomon coding check bytes.

17. The method according to claim 14, wherein the error correction code bytes are Reed-Solomon coding check bytes and Viterbi control codes.

18. The method according to claim 1, wherein each fixed-sized satellite/wireless frame formed in said forming step includes: a header, a payload comprising a variable number of variable-size spackets, and the variable number of error correction code bytes.

19. The method according to claim 18, wherein the header of each satellite/wireless frame includes: a field indicating the number of spackets in the frame; a field indicating a size of a first partial spacket in the frame; a field indicating a sequence number of the frame; a field indicating the number of error correction code bytes in the frame; a field indicating the number of error correction code bytes to be used in frames to be received; and a field indicating whether the spackets in the frame are compressed.

20. The method according to claim 19, wherein the field indicating the number of error correction code bytes in the frame, the field indicating the number of error correction code bytes to be used in frames to be received, and the field indicating whether the spackets in the frame are compressed are inserted in a same field location in frames having different frame numbers.

21. The method according to claim 18, wherein the error correction code bytes are Reed-Solomon coding check bytes.

22. The method according to claim 1, further comprising the steps of:
receiving satellite/wireless frames from the satellite or wireless network;
resequencing the spackets contained in the received satellite/wireless frames and reassembling the frame relay packets from the resequenced spackets; and
transmitting the reassembled frame relay packets to the frame relay network.

23. The method according to claim 22, further comprising the step of decompressing the spackets prior to resequencing the spackets.

24. A system for processing frame relay data to be transported over a satellite or wireless network, comprising:
a frame relay physical and data link layer processor for receiving frame relay packets from a frame relay network;
a prioritizer for prioritizing the frame relay packets;
a segmentation processor for segmenting the payload data of each of the frame relay packets to form spackets;
a scheduler for scheduling transmission of the spackets in accordance with priorities of the frame relay packets to which the spackets correspond; and
a satellite/wireless frame processor adapted to form fixed-sized satellite/wireless frames to be transmitted over the satellite or wireless network, each of the fixed-sized satellite/wireless frames including a variable number of error correction code bytes.

25. The system according to claim 24, further comprising a data compressor for compressing the spackets prior to formation of the satellite/wireless frames.

26. The system according to claim 24, wherein said prioritizer queues the spackets in a plurality of data queues as a function of priorities of the frame relay packets to which the spackets correspond.

27. The system according to claim 26, wherein the plurality of queues correspond to different priority levels.

28. The system according to claim 26, wherein the plurality of queues correspond to a plurality of virtual channels.

29. The system according to claim 24, wherein said segmentation processor segments the payload data of each of the frame relay packets into plural spackets, wherein all of the plural spackets, except a last of the plural spackets, is required to be n bytes in length, where n is an integer.

30. The system according to claim 24, wherein said segmentation processor prepends each spacket with a header.

31. The system according to claim 30, wherein the header of each spacket includes: a packet number indicating to which frame relay packet the spacket corresponds; a sequence number indicating the position of the spacket within the frame relay packet; a VC Id field indicating the virtual channel to which the frame relay packet corresponds; and a last field indicating whether or not the spacket is the last spacket in the frame relay packet.

32. The system according to claim 31, wherein a VC identifier contained in the VD Id field is compressed from a VC identifier contained in the frame relay packet.

33. The system according to claim 24, wherein the spackets contained within a satellite/wireless frame are variable in size.

34. The system according to claim 24, wherein a single spacket is transmittable over plural satellite/wireless frames.

35. The system according to claim 24, wherein said satellite/wireless frame processor forms an interleaver frame from plural satellite/wireless frames, wherein the order of the bytes in the interleaver frame is rearranged to spread the effects of burst errors over several satellite/wireless frames.

36. The system according to claim 24, wherein said satellite/wireless frame processor monitors the condition of a link over the satellite or wireless network and varies the variable number of error correction code bytes in response to variations in link conditions.

37. The system according to claim 36, wherein said satellite/wireless frame processor calculates a byte error ratio and sets the number of error correction code bytes as a function of the byte error ratio.

38. The system according to claim 37, wherein the byte error ratio is calculated more quickly when the bit error rate is high and more slowly when the bit error rate is low.

39. The system according to claim 36, wherein the error correction code bytes are Reed-Solomon coding check bytes.

40. The system according to claim 36, wherein the error correction code bytes are Reed-Solomon coding check bytes and Viterbi control codes.

41. The system according to claim 24, wherein each fixed-sized satellite/wireless frame includes: a header, a payload comprising a variable number of variable-size spackets, and the variable number of error correction code bytes.

42. The system according to claim 41, wherein the header of each satellite/wireless frame includes: a field indicating the number of spackets in the frame; a field indicating a size of a first partial spacket in the frame; a field indicating a sequence number of the frame; a field indicating the number of error correction code bytes in the frame; a field indicating the number of error correction code bytes to be used in frames to be received; and a field indicating whether the spackets in the frame are compressed.

43. The system according to claim 42, wherein the field indicating the number of error correction code bytes in the frame, the field indicating the number of error correction code bytes to be used in frames to be received, and the field indicating whether the spackets in the frame are compressed are inserted in a same field location in frames having different frame numbers.

44. The system according to claim 41, wherein the error correction code bytes are Reed-Solomon coding check bytes.

45. The system according to claim 24, further comprising:
- a receive satellite/wireless frame processor for receiving satellite/wireless frames from the satellite or wireless network;
- a reassembly and resequencer processor for resequencing the spackets contained in the received satellite/wireless frames and reassembling the frame relay packets from the resequenced spackets;
- wherein said frame relay physical and data link layer processor transmits the reassembled frame relay packets to the frame relay network.

46. The system according to claim 45, further comprising a data decompressor for decompressing the spackets prior to resequencing the spackets.

* * * * *